Figure 6:
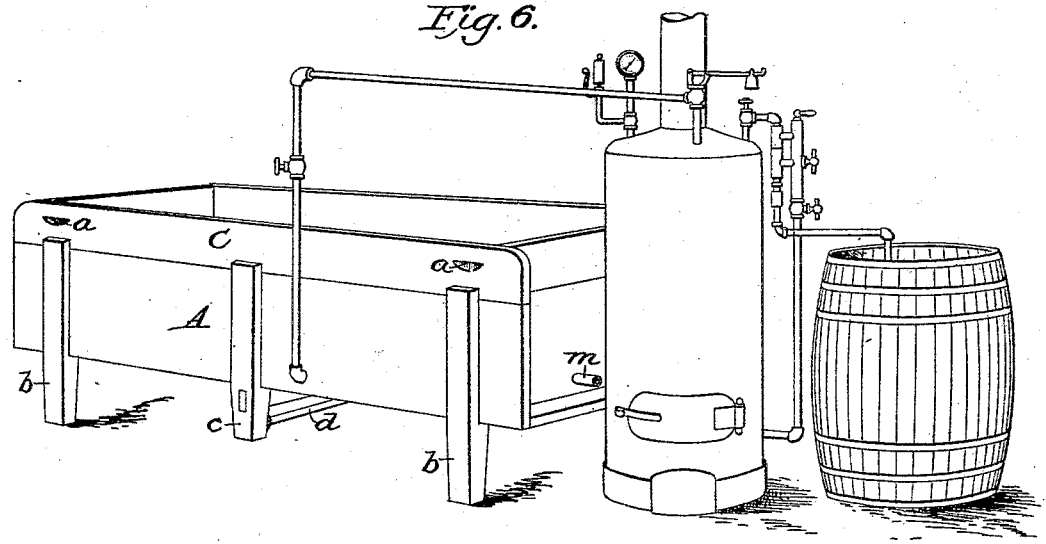

(No Model.) 2 Sheets—Sheet 1.
D. W. CURTIS.
MILK VAT.
No. 425,494. Patented Apr. 15, 1890.
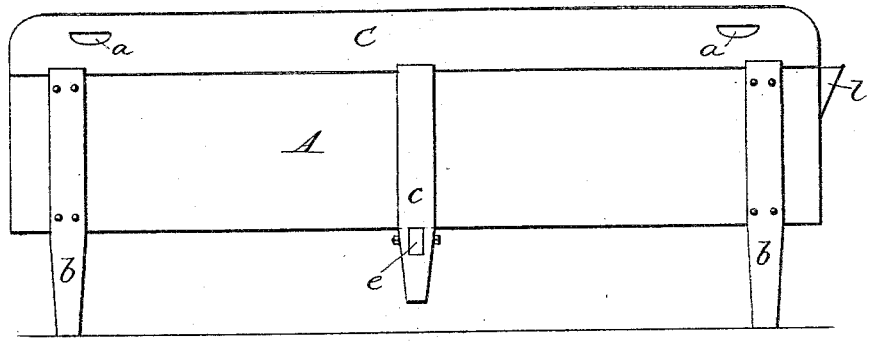
Fig. 1.
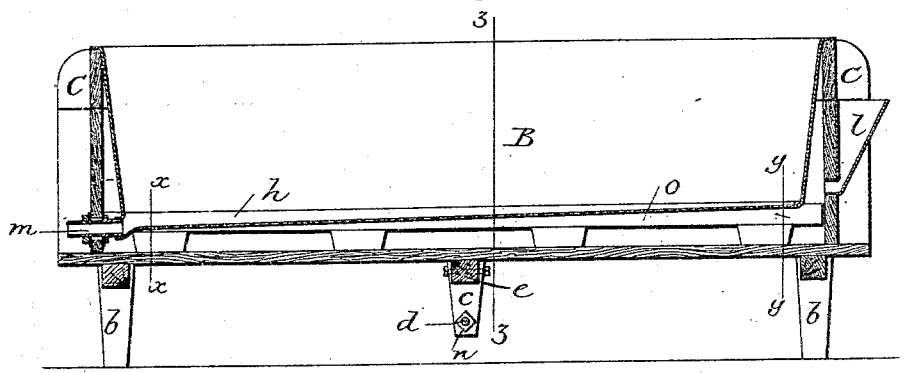
Fig. 2.
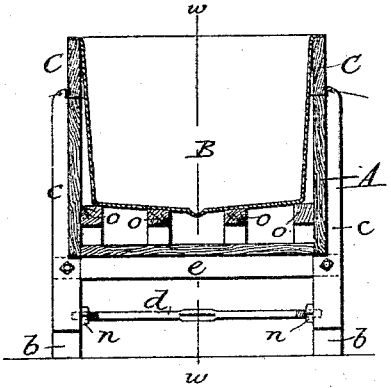
Fig. 3.
Fig. 4.
Fig. 5.
Attest:
Sidney P. Hollingsworth
Horace A. Dodge
Inventor:
D. W. Curtis,
by Dodge & Sons
Attys.

(No Model.) 2 Sheets—Sheet 2.

D. W. CURTIS.
MILK VAT.

No. 425,494. Patented Apr. 15, 1890.

Witnesses:
James F. Duhamel
Horace A. Dodge

Inventor:
D. W. Curtis,
by Dodge & Sons
Attys

UNITED STATES PATENT OFFICE.

DAVID W. CURTIS, OF FORT ATKINSON, WISCONSIN, ASSIGNOR OF TWO-THIRDS TO O. S. CORNISH AND W. S. GREENE, BOTH OF SAME PLACE.

MILK-VAT.

SPECIFICATION forming part of Letters Patent No. 425,494, dated April 15, 1890.

Application filed March 18, 1889. Serial No. 303,762. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Milk-Vats, of which the following is a specification.

My invention relates to that class of milk-vats used in factories for the manufacture of butter and cheese; and the invention consists, primarily, in the peculiar construction of the bottom of the milk-vat and in certain details and combinations, as hereinafter more fully set forth.

Figure 1 is a side elevation of the vat set in a tank ready for use. Fig. 2 is a longitudinal vertical section of the vat and tank. Fig. 3 is a transverse vertical section on the line z z of Fig. 2. Fig. 4 is a transverse vertical section of the bottom of the vat alone on the line y y, and Fig. 5 is a similar view taken on the line x x of Fig. 2. Fig. 6 is a perspective view of the vat and tank with its connections to a steam-boiler, ready for use.

As is well known, these vats and tanks are extensively used in creameries or factories for the manufacture of both butter and cheese, and many forms of them have been devised from time to time.

The object of my present invention is to overcome certain difficulties or objections which are found to exist in this class of devices as generally constructed.

One important object sought to be accomplished is to so construct the milk-vat and its supporting-tank that the vat can be quickly emptied and thoroughly cleansed, as it is a well-known fact that milk and its products are great absorbers of foul smells and flavors, and that the most scrupulous care is required to cleanse the vat of every particle of the milk, cream, or curd, as if any be left adhering it soon decomposes and becomes offensive and imparts its flavors and injurious qualities to the milk or cream subsequently placed in the vat, thereby imparting to the product a bad taste besides injuring its keeping qualities.

Another object is to enable the whey to be readily and thoroughly drained or separated from the curd when making cheese, and to do this with the tank resting stationary on its legs without being moved. Heretofore these tanks have usually been provided at one end with what are termed "tilters"—that is, with levers with or without rollers—these levers being pivoted to the legs at one end of the tank, so that by operating them that end of the tank and vat can be elevated and thus give sufficient inclination to the vat to cause the contents to flow to the opposite end, where they are drawn off through a gate or stop-cock.

As the larger sized vats are about sixteen feet in length and hold six hundred gallons of milk, the weight of the whole, including the tank and the water therein, amounts to about three or three and a half tons; and, consequently, it requires considerable force or labor to operate the tilters, which are liable to get out of order, besides racking or straining the tank and rendering it liable to spring a leak. In addition to these objections the tank is connected to a steam-boiler by metal pipes, as shown in Fig. 6, and the tilting of the tank and vat springs and strains these pipes, tending to loosen their joints and requiring constant care and attention to keep them in order. In order to obviate these several objections and produce a vat and tank that will accomplish the desired results in the most successful manner, I construct the vat B of sheet metal, as usual, with its bottom inclined from each side toward the center, as shown in Figs. 3, 4, and 5. At the center, I bend or swage the metal in such a manner as to form a continuous groove h, extending from end to end, as shown in Fig. 2, this groove or channel being comparatively shallow at its upper end and increasing gradually in depth throughout its entire length to the opposite end, where it terminates in a tube m, to which is secured the usual stop-cock or gate for drawing off the milk or whey. Fig. 4 shows the groove or channel in cross-section at the upper end on the line y y of Fig. 2, and Fig. 5 shows the same near its lower end on the line x x of Fig. 2. It will also be observed by examining Fig. 2 that the bottom as a whole is represented as being slightly inclined lengthwise; but this is not essential if the channel or groove h be made to incline sufficiently to give a free or rapid flow to the fluid therein. It will at once be seen that a vat thus constructed can be completely emptied of its fluid contents without tilting the tank and vat at all, and while standing solid and stationary on its feet. This feature becomes still more important in the manufacture of cheese, as now conducted. It was formerly the practice to let the curd and whey remain in the vat until an acid was developed; but by the improved method it is now desired to prevent the formation of an acid, and to this end it is desirable to separate the whey from the curd in the quickest manner possible after the curd has reached the proper stage. Formerly this was done by first cutting the curd, then sinking into the mass a circular strainer through the meshes of which the whey gradually passed when it was drawn off by a siphon as far as possible, but of course more or less would remain.

By means of this improved vat the process is as follows: A strainer is first laid in the bottom of the vat over the entire length of the central channel. The milk is then put in, the steam from the boiler let into the tank under and around the vat until the milk is heated to about 98°, the rennet then added, and as soon as the milk is coagulated the curd is cut by means of a curd-knife, when the whey at once runs down the inclined sides of the bottom into the central channel and is drawn off, it being thus separated from the curd in much less time and far more effectually than by the old method and appliances. It will also be seen that by this construction of the vat, by which the tilting is rendered unnecessary, the pipes connecting the tank with the boiler are never disturbed, and the same is true with the pipes sometimes used for conveying either hot or cold water to the tank.

The metallic portion of the vat is secured at its upper edge to a frame C, which rests upon the top edge of the tank all around, the only peculiarity of this frame being that its side pieces, instead of extending beyond the ends of the tank to form handles, as is the usual custom, only come flush or even with the ends of the tank, and have recesses a cut in their outer faces, one near each end, as shown in Fig. 1, to form hand-holds, by which to lift it when necessary. Its bottom is supported by a series of longitudinal strips or bars resting on the bottom of the tank, as shown in Figs. 2 and 3, they being cut away on their under faces at intervals, as shown, to permit a free circulation of the water, whether hot or cold, so as to secure uniformity of temperature throughout. The great length of these large tanks with the pressure of the fluid within them often causes their sides to spring or bulge outward at the center, and this has a tendency to open the joints and to throw the top edge out of line so that the frame C of the vat does not retain a good even bearing, or both may bulge outward. To remedy this I secure on each side of the tank at the center an upright bar c, similar to the legs b at the ends, except that these uprights c do not extend to the floor, as clearly shown in Figs. 1 and 2. Underneath the bottom of the tank A these uprights are connected by a cross-bar e, and at or near their lower ends I insert a rigid rod d, having a screw-thread cut on each end and place thereon nuts n, one at each end, as shown in Fig. 3, so that by adjusting the nuts the lower ends of these uprights can be forced asunder, thereby throwing their upper ends inward to prevent or compensate for any tendency of the sides to spring or bulge outward. By examining Figs. 1 and 3 it will be seen that the upper ends of these uprights c project above the top of the tank A, and thus form supports for the sides of the vat, and thereby prevent it from spreading or bulging outward.

By having the tank rest on the feet at its four corners only it stands more steady and firm and is less liable to be rocked or moved, especially when the floor is more or less uneven, as it is generally apt to be.

By these several improvements I am enabled to produce an apparatus that is admirably adapted to the business, that can be used with less labor, and produces superior results.

I am aware that inclined grooves or channels have before been used; but I am not aware that a milk-vat has ever before been made like this; and Therefore what I claim as my improvement is—

1. A metallic vat B, having its bottom inclined from its side walls toward the center, and these provided with a longitudinal groove or channel of continuously-increasing depth from one end to the other, said channel terminating in or being connected to a tube for the attachment of a stop-cock or gate, substantially as shown and described.

2. As a new article of manufacture, a milk-vat having its upper edges secured to a frame C for supporting it in a tank, and having its bottom provided with a central groove or channel of continuously-increasing depth extending from end to end of the vat, with a tube for the attachment of a stop-cock at its lower end, the bottom being inclined from the sides to said central channel, substantially as and for the purpose set forth.

3. The tank A, provided with the uprights c, tied together by a cross-bar e, in combination with the rod d and nuts n, all arranged to operate substantially as and for the purpose set forth.

In witness whereof I hereunto set my hand in the presence of two witnesses.

DAVID W. CURTIS.

Witnesses:
L. GOSSELIN,
J. M. SMETHURST.

It is hereby certified that in Letters Patent No. 425,494, granted April 15, 1890, upon the application of David W. Curtis, of Fort Atkinson, Wisconsin, for an improvement in "Milk-Vats," an error appears in the printed specification requiring the following correction: In line 105, page 2, the word "these" should read *there;* and that the said Letters Patent should be read with this correction therein that the same may conform to the record of the case in the Patent Office.

Signed, countersigned, and sealed this 22d day of April, A. D. 1890.

[SEAL.]

CYRUS BUSSEY,
*Assistant Secretary of the Interior.*

Countersigned:
    C. E. MITCHELL,
        *Commissioner of Patents.*